UNITED STATES PATENT OFFICE.

JENS DEDICHEN, OF BERLIN-HALENSEE, GERMANY, ASSIGNOR, BY MESNE ASSIGNMENTS, TO THE CHEMICAL FOUNDATION, INC., A CORPORATION OF DELAWARE.

BLUE TETRAKISAZO DYES.

1,319,852.  Specification of Letters Patent.  Patented Oct. 28, 1919.

No Drawing.  Application filed November 6, 1916. Serial No. 129,829.

*To all whom it may concern:*

Be it known that I, JENS DEDICHEN, a citizen of Norway, residing at Berlin-Halensee, Germany, my P. O. address being Seenerstrasse 25, Berlin-Halensee, Germany, have invented certain new and useful Improvements in Blue Tetrakisazo Dyes, of which the following is a specification.

The objects of my invention are new tetrakis-azo-dyes, which dye cotton blue and may be treated on the fiber with formaldehyde, thus giving blue dyeings of a good fastness to light and washing.

The dyes correspond to the general formula:

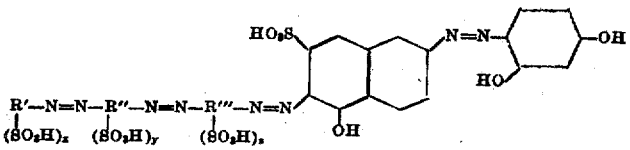

R', R" and R'" meaning aromatic radicals and the sum of $x$, $y$ and $z$ being 3 ($x=1$ or 2, $y=0$ or 1, $z=0$ or 1).

These dyes in the shape of their alkali metal salts are black powders, soluble in water to blue solutions from which hydrochloric acid precipitates violet flocks. They are soluble in concentrated sulfuric acid to blackish solutions from which the dyes are separated by addition of ice. Strong reducing agents destroy the dyes yielding aminoresorcinol, an aminoarylsulfonic acid and besides other diamino-compounds 2.6-diamino-5-naphthol-7-sulfonic acid.

The dyes may be manufactured by first combining a diazoarylsulfonic acid (with the exception of 2-diazo-naphthalene-4.8-disulfonic acid) with a middle component capable, when combined, of being further diazotized, rediazotizing the product thus obtained, combining it with a molecular proportion of a second middle component, rediazotizing again, combining in the presence of an alkali with a molecular proportion of 2-amino-5-naphthol-7-sulfonic acid, rediazotizing once again and combining finally with resorcinol.

As middle components 3-toluidin, paraxylidin, 3-amino-4-methoxy-1-methylbenzene, 1-naphthylamin or its 6- or 7-sulfonic acid, 1-amino-2-naphtholether or its 6- or 7-sulfonic acid, 2-amino-5-naphthol-7-sulfonic acid are specially suitable.

To illustrate how the process may be carried out the following example is given, the parts being by weight:

The diazo-compound prepared from 17.3 parts of metanilic acid by means of 6.9 parts of sodium nitrite and 30 parts of hydrochloric acid of 12° Baumé is combined with 14.3 parts of 1-napthylamin dissolved with 25 parts of hydrochloric acid of 12° Baumé in water. The intermediate product is filtered off, dissolved in water by addition of sodium hydroxid, mixed with 6.9 parts of sodium nitrite and diazotized by mixing with an excess of hydrochloric acid. The diazo compound is mixed with a solution of 25 parts of sodium-1-naphthylamin-6-sulfonate. Then sodium acetate is added in a quantity sufficient to bind the excess of hydrochloric acid. The intermediate product thus formed is rendered alkaline, salted out and filtered off. Subsequently it is mixed with water and diazotized with the aid of 7 parts of sodium nitrite and hydrochloric acid by stirring for a good space of time. The combination with 23.9 parts of 2-amino-5-naphthol-7-sulfonic acid quickly occurs in the presence of an excess of sodium carbonate. The trisazo-dye may be isolated by salting out; it is then dissolved in hot water and after cooling at 5° C. diazotized in presence of hydrochloric acid with 7 parts of sodium nitrite while stirring during 3 hours. Then the diazo-compound is allowed to flow into a cold solution of 11 parts of resorcinol maintained alkaline with sodium carbonate. The tetrakisazo-dye is salted out, drained and dried. It corresponds probably to the formula:

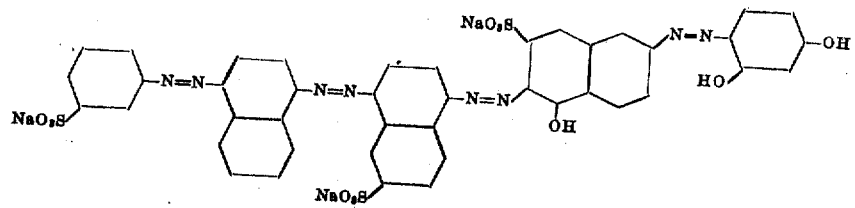

It shows the properties mentioned above. Its reduction products are metanilic acid, 1.4-diaminonaphthalene, 1.4-diaminonaphthalene-6-sulfonic acid, 2.6-diamino-5-naphthol-7-sulfonic acid and aminoresorcinol.

It is to be understood that the invention is not limited to the above example. For instance similar dyes are obtained if metanilic acid is replaced by the equivalent quantity of 1-naphthylamin-4.7 or 3.6-disulfonic acid, anilin-2.4 or 2.5-disulfonic acid or 4-chloro-1-amino-benzene-3-sulfonic acid. The constitution of the dye mentioned at last may be expressed by the formula:

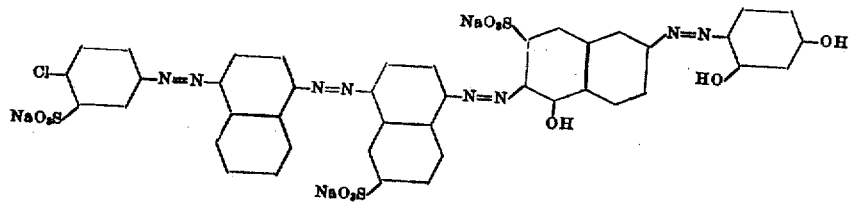

Having now described my invention and in what manner it may be carried out what I claim is—

1. The herein-described tetrakisazo-dyes of the formula:

$$R'-N=N-R''-N=N-R'''-N=N-$$
$$(SO_3H)_x \quad (SO_3H)_y \quad (SO_3H)_z$$

where R' is the radical of a 3-sulfonic acid of the anilin series and R'' and R''' are radicals of the naphthalene series, the sum of $x$, $y$ and $z$ being 3; being in the shape of alkali metal salts blackish powders soluble in water to blue solutions from which hydrochloric acid precipitates violet flocks and from which cotton is dyed blue; soluble in concentrated sulfuric acid to blackish solutions from which the dyes are precipitated again by the addition of ice; yielding upon reduction aminoresorcinol, an aminoaryl-3-sulfonic acid of the benzene series, 1.4-diamino compounds of the naphthalene series and 2.6-diamino-5-naphthol-7-sulfonic acid.

2. The herein-described tetrakisazo dye of the formula:

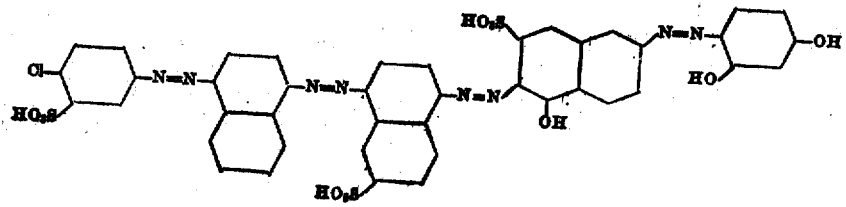

being in the shape of its sodium salt a blackish powder soluble in water to a blue solution from which hydrochloric acid precipitates violet flocks and from which cotton is dyed blue; soluble in concentrated sulfuric acid to a blackish solution from which the dye is separated again by addition of ice; yielding upon reduction 4-chloro-1-aminobenzene-3-sulfonic acid, 1.4-diaminonaphthalene, 1.4-diaminonaphthalene-6-sulfonic acid, 2.6-diamino-5-naphthol-7-sulfonic acid and aminoresorcinol.

In testimony whereof I affix my signature in presence of two witnesses.

JENS DEDICHEN.

Witnesses:
 HENRY HASPER,
 ALLEN E. JENNINGS.